United States Patent [19]

Martinez

[11] Patent Number: 5,270,686

[45] Date of Patent: Dec. 14, 1993

[54] PIZZA DELIVERY CONTAINER WITH TILT ALARM

[76] Inventor: Raul Martinez, 70 Pitt St., Apt. 7E, New York, N.Y. 10002

[21] Appl. No.: 886,595

[22] Filed: May 21, 1992

[51] Int. Cl.⁵ .............................................. G08N 21/00
[52] U.S. Cl. .................................. 340/689; 206/545; 340/540
[58] Field of Search ............... 340/689, 540; 206/545, 206/525, 521; 220/337

[56] References Cited

U.S. PATENT DOCUMENTS

| | | | |
|---|---|---|---|
| 2,772,411 | 11/1956 | Cooper | 340/689 |
| 3,353,886 | 11/1967 | Tompkins | 206/545 |
| 3,906,478 | 9/1975 | Smey | 340/689 |
| 4,189,726 | 2/1980 | Rosa et al. | 340/689 |
| 4,376,558 | 3/1983 | Bandar | 206/545 |
| 4,476,989 | 10/1984 | Larsen | 206/545 |
| 4,802,233 | 1/1989 | Skamser | 206/545 |
| 4,848,543 | 7/1989 | Doboze | 206/545 |

*Primary Examiner*—Glen R. Swann, III
*Attorney, Agent, or Firm*—Leon Gilden

[57] ABSTRACT

A container has a container cavity bounded by top, bottom, and side walls, as well as a rear wall, with an entrance cavity at forward ends of the side walls, with the side walls having recesses arranged for ease of displacement and removal of a pizza container positioned within the delivery container. Rollers are mounted in a parallel relationship coextensively relative to the top wall for ease of insertion and removal of a pizza container relative to the delivery container. An audio alarm is mounted to the container actuated in response to inclination of the container in use.

3 Claims, 4 Drawing Sheets

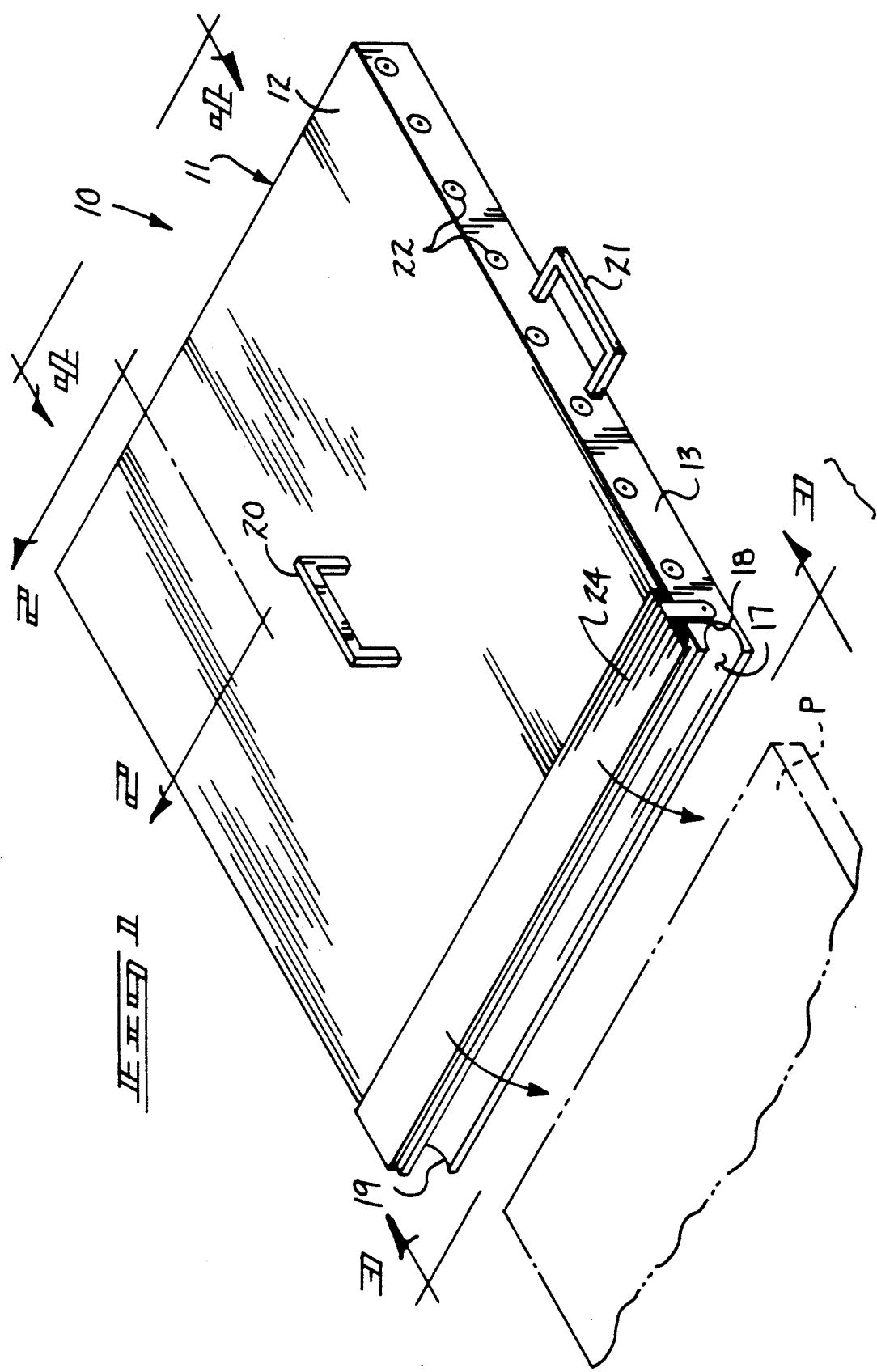

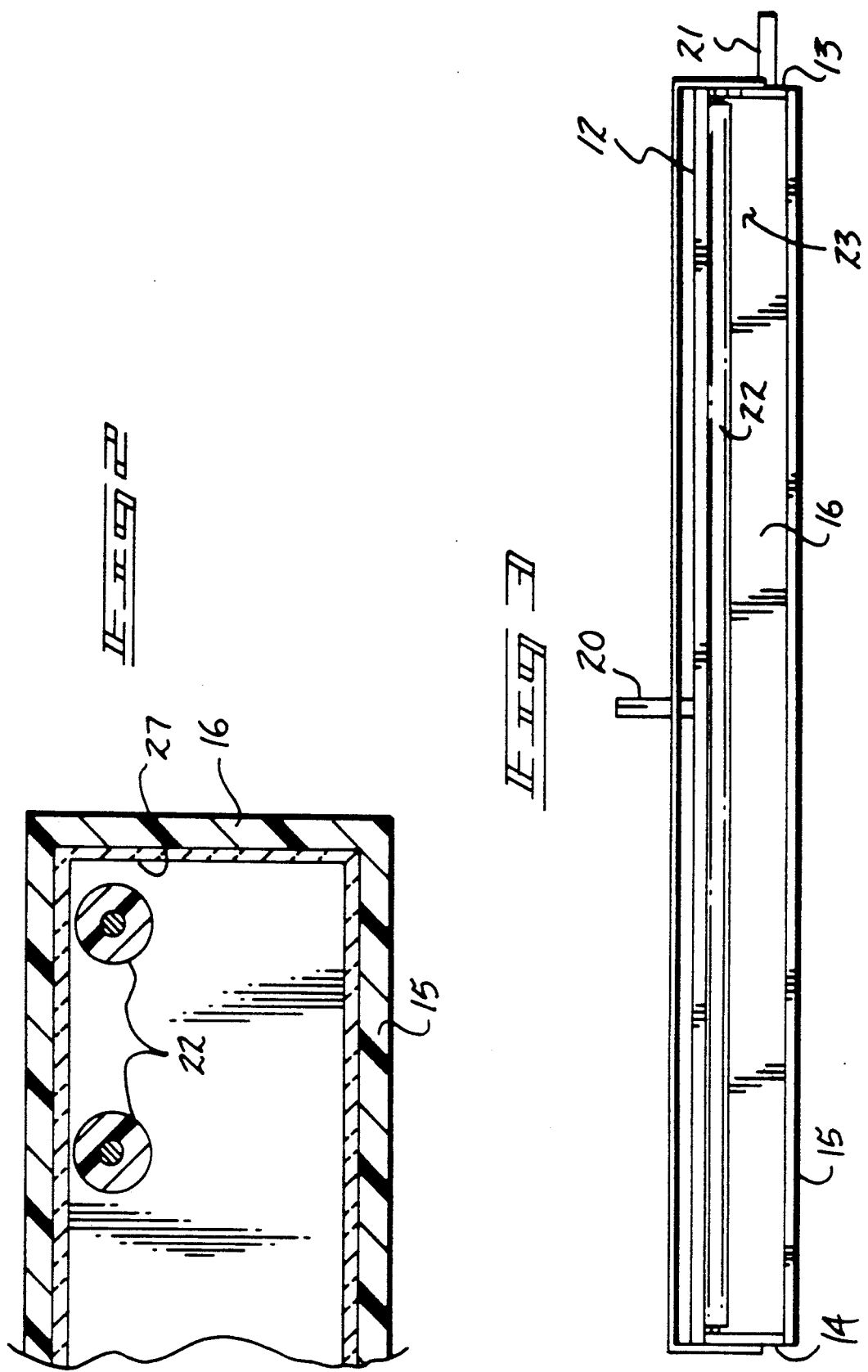

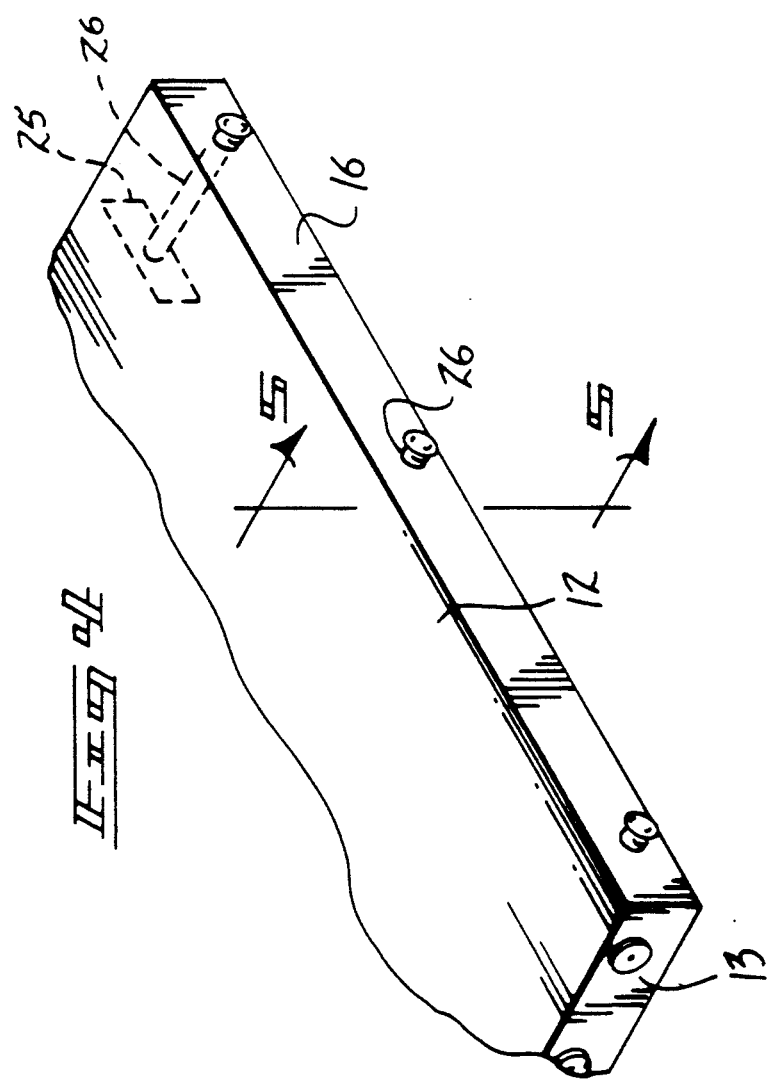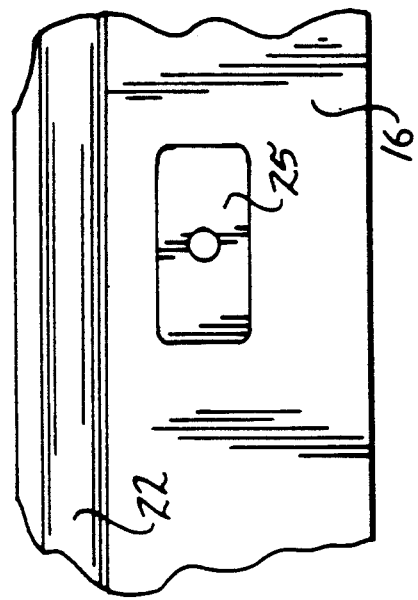

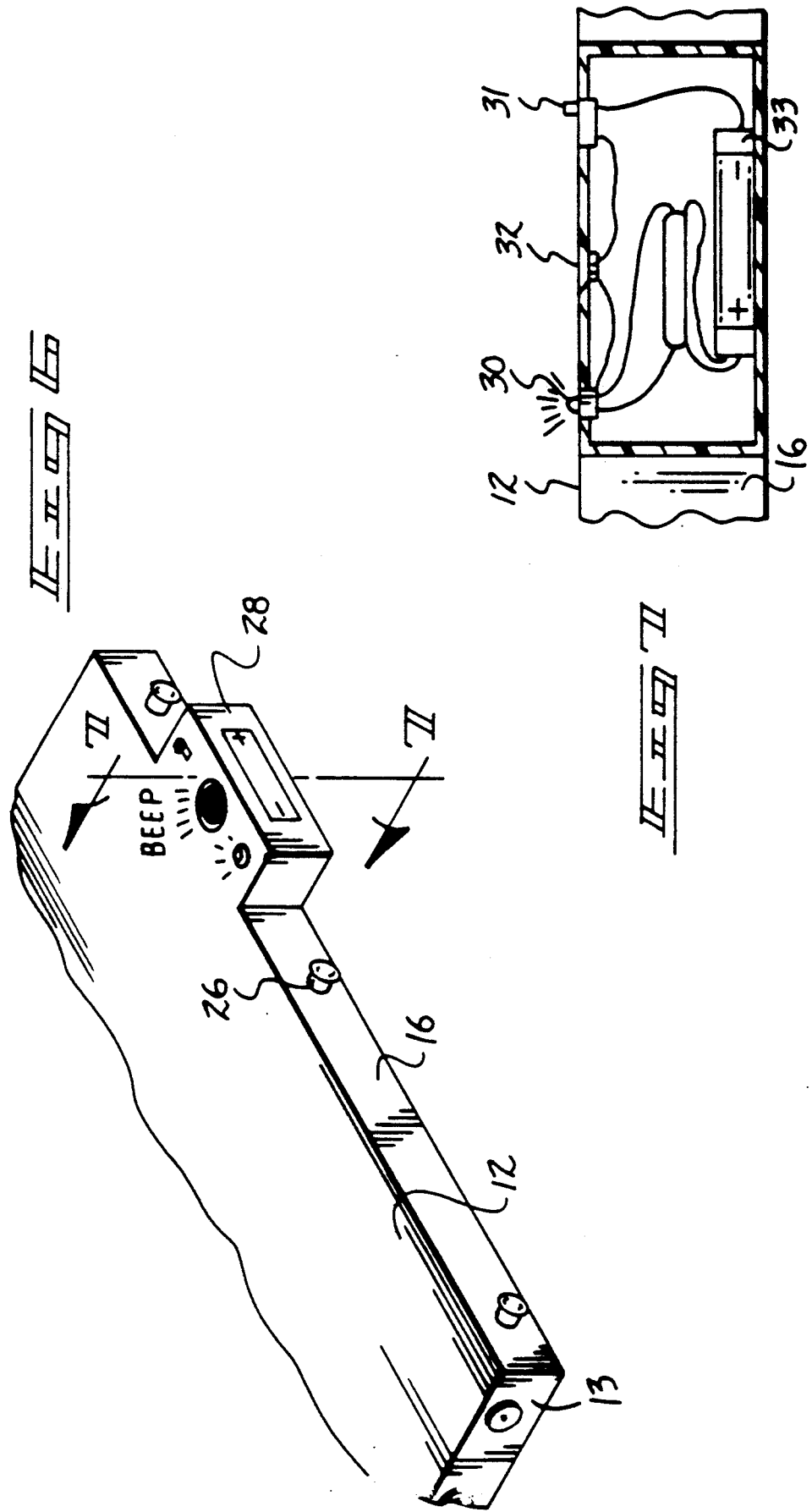

PIZZA DELIVERY CONTAINER WITH TILT ALARM

BACKGROUND OF THE INVENTION

1. Field of the Invention

The field of invention relates to pizza transport container structure, and more particularly pertains to a new and improved pizza delivery container apparatus wherein the same is arranged for the ease of transport and manipulation of a pizza container for delivery thereof.

2. Description of the Prior Art

The delivery of pizzas requiring the maintaining of heat and protection of the pizza food component is addressed in the prior art and exemplified in U.S. Pat. Nos. 4,922,626; 4,944,452; 4,441,626; and 4,806,736.

The instant invention attempts to overcome deficiencies of the prior art by providing for a compact and ease of use organization permitting ease of insertion and removal of a pizza container from the delivery container and in this respect, the present invention substantially fulfills this need.

SUMMARY OF THE INVENTION

The present invention provides a pizza delivery container apparatus wherein the same provides for an entrance opening into a rigid container housing permitting ease of insertion and removal of pizza containers therefrom. As such, the general purpose of the present invention, which will be described subsequently in greater detail, is to provide a new and improved pizza delivery container apparatus which has all the advantages of the prior art pizza delivery container apparatus and none of the disadvantages.

To attain this, the present invention provides a container having a container cavity bounded by top, bottom, and side walls, as well as a rear wall, with an entrance cavity at forward ends of the side walls, with the side walls having recesses arranged for ease of displacement and removal of a pizza container positioned within the delivery container. Rollers are mounted in a parallel relationship coextensively relative to the top wall for ease of insertion and removal of a pizza container relative to the delivery container.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pizza delivery container apparatus which has all the advantages of the prior art pizza delivery container apparatus and none of the disadvantages.

It is another object of the present invention to provide a new and improved pizza delivery container apparatus which may easily and efficiently manufactured and marketed.

It is a further object of the present invention to provide a new and improved pizza delivery container apparatus which is of a durable and reliable construction.

An even further object of the present invention is to provide a new and improved pizza delivery container apparatus which is susceptible of a low cost of manufacture with regard to both materials and labor, and which accordingly is then susceptible of low prices of sale to the consuming public, thereby making such pizza delivery container apparatus economically available to the buying public.

Still yet another object of the present invention is to provide a new and improved pizza delivery container apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view, taken along the lines 2—2 of FIG. 1 in the direction indicated by the arrows.

FIG. 3 is an orthographic view, taken along the lines 3—3 of FIG. 1 in the direction indicated by the arrows.

FIG. 4 is an orthographic view, taken along the lines 4—4 of FIG. 1 in the direction indicated by the arrows.

FIG. 5 is an orthographic view, taken along the lines 5—5 of FIG. 4 in the direction indicated by the arrows.

FIG. 6 is an isometric illustration of the invention utilizing an alarm housing mounted thereon.

FIG. 7 is an orthographic view, taken along the lines 7—7 of FIG. 6 in the direction indicated by the arrows.

DESCRIPTION OF THE PREFERRED EMBODIMENT

With reference now to the drawings, and in particular to FIGS. 1 to 7 thereof, a new and improved pizza delivery container apparatus embodying the principles and concepts of the present invention and generally designated by the reference numeral 10 will be described.

More specifically, the pizza delivery container apparatus 10 of the instant invention essentially comprises a container housing 11 having a top wall 12 spaced from and parallel a bottom wall 15. A rear wall 16 is provided, with the first side wall and second side wall 13 and 14 extending orthogonally and forwardly of the rear wall 16, with the first side wall and second side wall orthogonally directed between and coextensive with the top wall and bottom wall of the housing 11. A forward entrance opening 17 is defined at forward distal ends of the side walls, bottom wall, and top wall, with the first and second side walls 13 and 14 respectively having first and second side wall recess 18 and 19, with the side walls at the entrance opening for ease of access to a pizza container "P" directed within the container cavity 23 of the container housing 11. A first handle 20 is mounted to the top wall, with the second handle 21 mounted to the first side wall. Typically, the first handle is utilized during positioning of the container during transport of a pizza box "P" therewithin, wherein typically the second handle 21 is utilized during transport of the container housing 11 when the pizza box "P" is removed therefrom. A plurality of parallel rollers 22 are orthogonally and rotatably mounted between the first and second side walls 13 and 14 arranged parallel to and adjacent the top wall 12 to permit ease of insertion and removal of the pizza box "P" within the container cavity 23 through the entrance opening 17. A door flap 24 is provided arranged coextensive with the entrance opening 17 and pivotally mounted to the sides 13 and 14 to permit closure of the entrance opening in a first lowered position and access through the entrance opening in a second raised orientation, as illustrated in FIG. 1.

The container 11 further includes an insulative liner 27 mounted coextensively within the rigid container structure 11, as illustrated in FIG. 2. Further, the rear wall 16 has threadedly and orthogonally directed therethrough a plurality of threaded rods 26 projecting into the container cavity 23, with each forward distal end of each threaded rod 26 including an abutment plate 25 orthogonally mounted to each respective threaded rod (FIG. 4), whereupon threaded projection of each threaded rod interiorly of the cavity 23 provides for abutment of pizza boxes "P" of various dimensions to permit unwarranted and undesired shifting of the pizza box "P" during transport thereof within the container housing 11.

The FIGS. 6 and 7 illustrate the use of an alarm housing 28 mounted to the container and projecting from the rear wall 15 thereof. The alarm housing has an alarm housing cavity, including a battery 33 positioned therewithin, with a switch 31 directed through a top wall of the alarm housing 28. An illumination bulb 30 projects through the top wall of the alarm housing, as well as an audible alarm 32. A mercury switch 34 is in electrical communication with the battery 33 and the illumination bulb 30, as well as the audible alarm 32 through the switch 31, whereupon tilting of the container 11 effects closing of the mercury switch 34 to effect electrical communication of the battery and the audible alarm and the illumination bulbs 32 and 30 respectively. In this manner, maintaining the housing 11 in a horizontal orientation to minimize shifting of food components on a pizza contained within the pizza box "P" is effected and provides warning to an individual transporting the container 11 as to the undesired inclination of the container 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pizza delivery container apparatus, comprising,
   a container housing, the container housing having a top wall spaced from and parallel to a bottom wall, a first side wall and a second side wall extending coextensively and orthogonally between the top wall and the bottom wall on opposed sides of the top wall and the bottom wall, and a rear wall extending orthogonally between the first side wall and the second side wall at a first side wall and second side wall first end, the first side wall and second side wall second end having an entrance opening directed therebetween, and
   an entrance door pivotally mounted to the first side wall and second side wall extending coextensively between the first side wall and second side wall in an orthogonal relationship effecting closure of the entrance opening in a first position and pivoted in a spaced orientation relative to the entrance opening in a second position, and
   a first handle mounted to the top wall, and a second handle mounted to the first side wall for transport of the housing by the first handle when a pizza box is positioned within the container housing and transport of the container housing by the second handle upon removal of a pizza box relative to the container housing, and
   a plurality of rollers orthogonally and coextensively directed between the first side wall and the second side wall adjacent the top wall, wherein the rollers extend from the rear wall to the entrance opening.

2. An apparatus as set forth in claim 1 wherein the rear wall includes a plurality of threaded rods orthogonally and threadedly directed through the rear wall, with each threaded rod including a threaded rod forward distal end directed into the container housing, and each threaded rod forward distal end including an abutment plate orthogonally mounted thereto to provide abutment for a pizza box within the container housing.

3. An apparatus as set forth in claim 2 including an alarm housing mounted to the container housing, the alarm housing including an alarm housing top wall, the alarm housing top wall including an audible alarm and including a visual alarm directed through the alarm housing top wall, and an on/off switch mounted through the alarm housing top wall, and a battery positioned within the alarm housing, and a mercury switch positioned within the alarm housing in electrical communication between the switch, the battery, the visual alarm, and the audible alarm, whereupon tilting of the container housing relative to a horizontal orientation effects closure of the mercury switch to effect actuation of the audible alarm and the visual alarm.

* * * * *